Dec. 5, 1967  H. R. ROTTMANN  3,356,853
RADIATION SENSITIVE APPARATUS FOR INSPECTING THE
BOTTOM WALL OF HOLLOW TRANSPARENT CONTAINERS
Filed Jan. 4, 1965  2 Sheets-Sheet 1

INVENTOR.
HANS R. ROTTMANN
ATTORNEYS

Dec. 5, 1967  H. R. ROTTMANN  3,356,853
RADIATION SENSITIVE APPARATUS FOR INSPECTING THE
BOTTOM WALL OF HOLLOW TRANSPARENT CONTAINERS
Filed Jan. 4, 1965  2 Sheets-Sheet 2

INVENTOR.
HANS R. ROTTMANN
ATTORNEYS

3,356,853
RADIATION SENSITIVE APPARATUS FOR INSPECTING THE BOTTOM WALL OF HOLLOW TRANSPARENT CONTAINERS
Hans R. Rottmann, Poughkeepsie, N.Y., assignor to Owens-Illinois Glass Company, a corporation of Ohio
Filed Jan. 4, 1965, Ser. No. 423,060
8 Claims. (Cl. 250—223)

ABSTRACT OF THE DISCLOSURE

The inspecting system disclosed herein comprises supporting and moving containers on their sides through an inspection station and rotating each container rapidly about its axis while it is at the inspection station. A beam is directed through the open mouth of the container and focused in a spot in the bottom wall of the container. The beam is moved along a diameter and since the container is being rotated rapidly about its axis, the entire bottom wall is scanned. The beam normally passes through the bottom wall but if a defect is present, a portion of the beam is deflected out of its normal path into the line of vision of one of a plurality of light sensitive devices which is energized to produce a reject signal.

---

This invention relates to inspecting containers for defects and particularly to inspecting the bottom wall of hollow open mouth transparent containers for defects.

In the manufacture of glass containers and the like, occasional defects occur in the bottom wall in the form of spikes, checks, which are mirror-like reflective defects, and other deformities. It is, of course, desirable and essential to detect such containers and reject them.

It is therefore an object of this invention to provide a method and apparatus for inspecting the bottom walls of containers for such defects quickly and at high rate.

It is a further object of this invention to provide such a method and apparatus for detecting such defects while the containers are being moved continuously in a predetermined path.

It is a further object of the invention to provide such a method and apparatus for detecting said defects wherein containers of different sizes can be readily inspected.

Basically, the invention comprises supporting and moving containers on their sides through an inspection station and rotating each container rapidly about its axis while it is at the inspection station. A beam is directed through the open mouth of the container and focused in a spot in the bottom wall of the container. The beam is moved along a diameter and since the container is being rotated rapidly about its axis, the entire bottom wall is scanned. The beam normally passes through the bottom wall but if a defect is present, a portion of the beam is deflected out of its normal path into the line of vision of one of a plurality of light sensitive devices which is energized to produce a reject signal.

Figure 4:
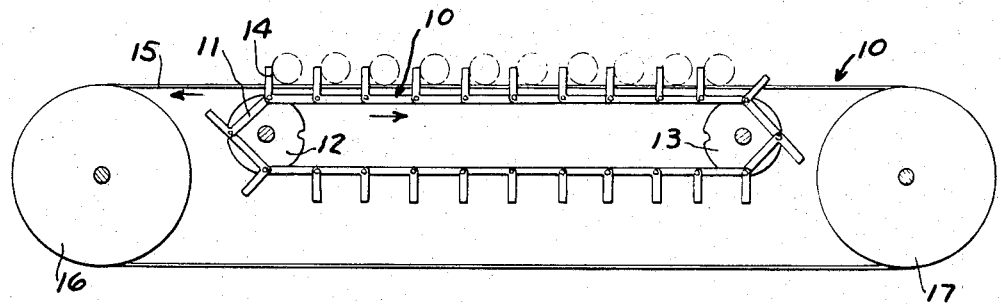
FIG. 4 is a side elevational view of a conveyor system utilized in connection with the apparatus.

Referring to FIG. 4, the inspecting method and apparatus is intended ot be utilized in connection with conveyors or continuously moving the containers in a predetermined path and rotating them rapidly during said movement. Thus, the apparatus shown in FIG. 4 comprises a horizontal conveyor 10 comprising endless chain members 11 which are trained over sprocket wheels 12, 13, one of which is driven continuously to move the upper reach of the conveyor rapidly to the right. A plurality of vertically extending lugs 14 are provided at longitudinally spaced points along the conveyor 10. The containers C to be inspected are positioned with their sides on the chain members 11 between lugs 14 and are moved from left to right as viewed in FIGS. 1 and 4 with the axes of the containers extending horizontally.

Figure 1:
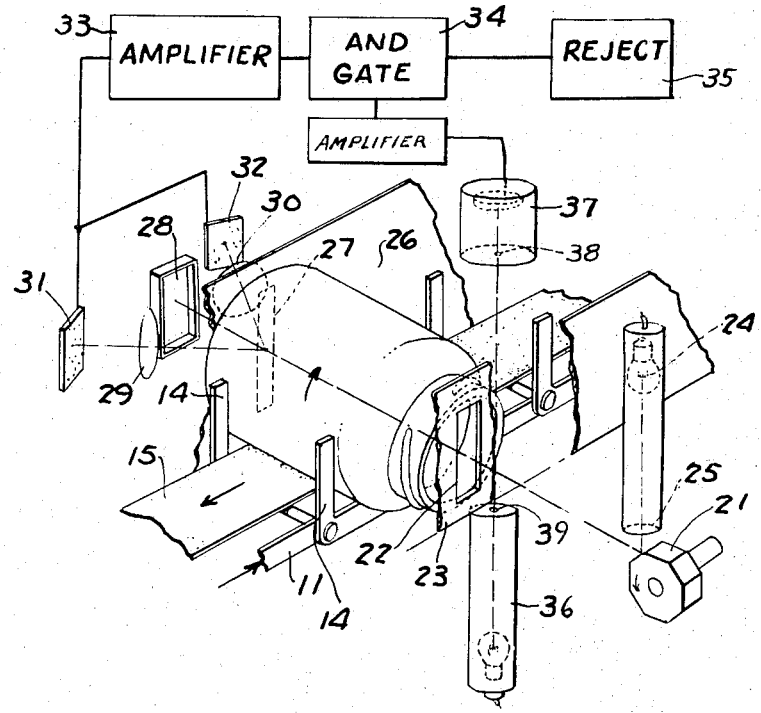
FIG. 1 is a fragmentary perspective view of an apparatus embodying the invention.

Between the chain members 11 and extending in parallel relation thereto is an endless belt 15 which is trained over pulleys 16, 17 and has its upper reach parallel to the upper reach of the conveyor 10. One of the pulleys 16, 17 is driven continuously so that the belt 15 has its upper reach driven to the left as shown in FIGS. 1 and 4, in the opposite direction from the conveyor 10. The containers C rest on the belt 15 and as the containers are moved by the lugs 14 on the chains 11 to the right as viewed in FIGS. 1 and 4, the belt 15 rotates the containers C about their horizontal longitudinal axes clockwise by frictional engagement of the upper surface of the belt 15 with the containers. In this manner, the containers C are rotated while being conveyed to the right. In practice, the belt 15 is rotated at a considerably faster speed than the chain 11, 12 so that the containers will be rotated at least one complete revolution during their movement through a narrow inspection zone as presently described.

Referring to FIG. 1, the source of radiant energy to which the containers C is transparent is positioned at a narrow inspection zone along the upper reach of the chain 11 and belt 15 and directs a beam of light downwardly against a rottaing multi-face mirror 21 which in turn directs the beam through an aperture 22 in a mask 23 into the open mouth of the container as the container passes the inspection station. The light source 20 includes an incandescent bulb 24 and a lens 25 that focuses the filament of the bulb 24 in a spot on the bottom wall B of the container. As the mirror 21 rotates rapidly, the spot moves vertically along a diameter of the bottom wall of the container. Thus, as the container C is rotating rapidly during its movement past the aperture 22, and the mirror 21 is also rotating rapidly, the light scans the entire bottom wall B of the container.

Figure 2:
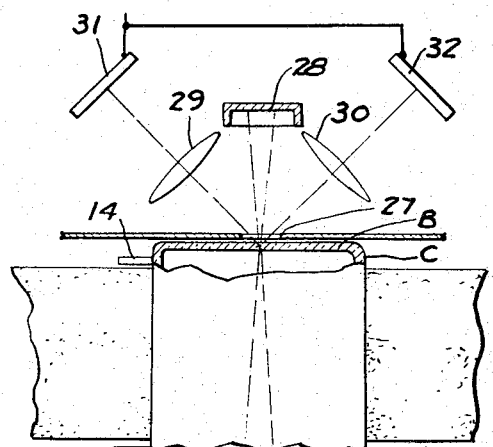
FIG. 2 is a part sectional plan view of the apparatus shown in FIG. 1.
Figure 3:
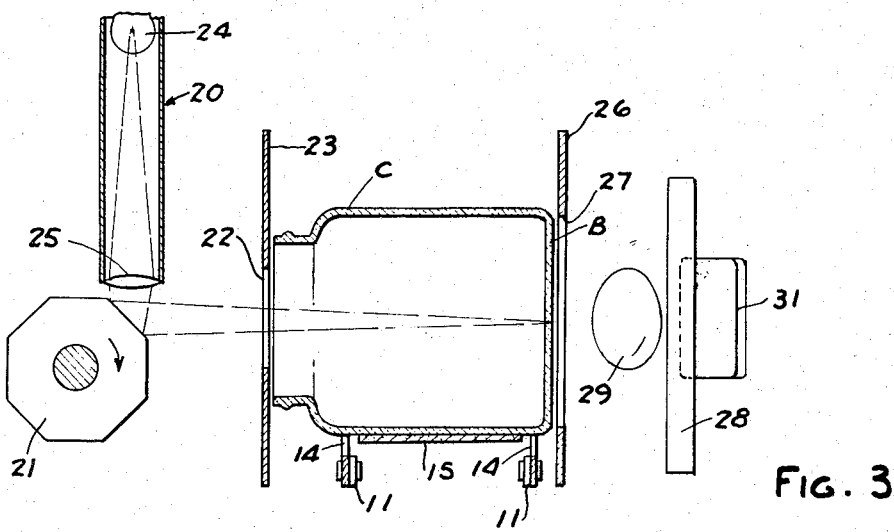
FIG. 3 is a vertical sectional elevational view of the apparatus shown in FIGS. 1 and 2.

A second mask 26 having a vertical aperture 27 is provided adjacent the outer surface of the bottom wall B. As shown in FIG. 2, if no defect is present, the beam passes directly through the bottom wall B and the aperture 27 against a light trap 28 of light absorbing material. If, however, there is a defect in the form of a spike, check or the like, a portion of the light is redirected by reflection, refraction or combined reflection and refraction. The deflected portion of light is directed out of the path of the light trap 28 toward one of the lenses 29, 30, on each side of the aperture 27, which are positioned with their axes intersecting the focal point of the spot of light in the bottom wall B. The redirected portion of light is then focused by one of the lenses 29, 30 on one or another of light sensitive devices 31, 32 which has their lines of vision aligned with the axes of the lenses 29, 30, respectively. Light sensitive devices 31, 32 can be of any known type that are sensitive to the radiant energy of the light source 24 such as silicon solar cells. If one or the other of the cells 31, 32 is energized, the resultant signal is amplified by an amplifier 33 and supplied to an "and" gate 34. In order to produce a reject signal only when a container is present at the inspection station, a second light source 36 is provided which directs a narrow beam through an aperture 39 vertically upwardly in the path of the container to a light sensitive device 37 which has a narrow aperture or line of vision 38. When a container arrives at the inspection station, the beam from the source 36 is interrupted causing the light sensitive device 37 to produce a signal that is amplified by an amplifier 33.

Thus, in accordance with the apparatus, as the containers C are moved continuously from left to right as viewed in FIGS. 1 and 4, and rotated rapidly about their axes, as a container C reaches the inspection station, it interrupts the beam from the second light source 36 thereby causing light sensitive device 37 to create a signal indicating the presence of the container at the inspection station. While the container is being rotated at the inspection station, the light beam from the source 20 scans the bottom wall of the container. If either of the light sensitive devices 31, 32 produces a signal at the time when the light to sensitive device 37 is interrupted, the resultant amplified signal and the signal from the second light sensitive device 37 actuate the "and" gate 34 to produce a reject signal and thereby energize the reject mechanism 35.

It can thus be seen that there has been provided a method and apparatus for inspecting the bottom walls of containers while the containers are being moved continuously without interrupting the movement of the containers.

I claim:

1. An apparatus for inspecting the bottom wall of hollow open mouth transparent containers for defects comprising
   means for supporting a container on its side,
   means for directing a beam of radiant energy to which the container material is transparent through the open mouth of the container and focusing said beam in a spot in the bottom wall of the container,
   said beam normally passing through the bottom wall of the container and being deflected by a defect in the bottom wall out of said normal path,
   means for rotating the container about its axis during said inspection,
   means for moving said spot along a diameter of the bottom wall as the container is rotated about its axis,
   a plurality of light sensitive means mounted adjacent the bottom wall of the container exteriorly thereof with the lines of vision of said means intersecting the path of said spot of said beam and out of the path of said beam,
   and means for creating a reject signal in response to energization of said light sensitive means.

2. The combination set forth in claim 1 including first mask means adjacent the mouth of the container and second mask means adjacent the bottom wall of the container limiting the field of scan of said beam and the field of vision of said light sensitive means, respectively, each said mask means having a diametrically extending aperture.

3. The combination set forth in claim 1 including light trap means into which the light beam normally passes after passing through the bottom wall of the container, said light sensitive means being disposed laterally of said light trap.

4. An apparatus for inspecting the bottom wall of hollow open mouth transparent containers for defects which comprises
   means for supporting and moving the containers successively through an inspection station with their axes extending generally horizontally and the open mouths of the containers extending to one side,
   means at said inspection station for directing a beam through the open mouth of a container as it passes through said inspection station and for focussing said beam in a spot on the bottom wall of the container to scan said bottom wall,
   said beam normally passing through the bottom wall of the container,
   means for rotating each container about its axis as it is moved through said inspection station,
   a plurality of light sensitive means positioned adjacent the outer surface of the bottom wall of the container with the lines of vision thereof intersecting the path of said spot of said beam on the bottom wall of the container and out of the normal path of said beam,
   and means for creating a signal in response to energization of said light sensitive means.

5. The combination set forth in claim 4 including a second light beam at said inspection station for directing a beam across the path of the container,
   and light sensitive means associated with said second light beam and adapted to be de-energized when said second light beam is interrupted by said container at said inspection station,
   and means for creating said reject signal only after said first mentioned light sensitive means and second light sensitive means have been energized.

6. The combination set forth in claim 4 including a first mask adjacent the mouth of the container having a diametrically extending aperture limiting the area through which the light beam passes and a second mask adjacent to the outer surface of the bottom wall of the container having a diametrically extending aperture limiting the area which is being viewed by said light sensitive means.

7. The combination set forth in claim 4 including a light trap adjacent the bottom wall of the container into which said light beam normally passes, said light sensitive means being disposed laterally of said light trap.

8. An apparatus for inspecting the bottom wall of hollow open mouth transparent containers for defects which comprises
   means for supporting and moving the container successively through an inspection station with their axes extending generally horizontally and the open mouths of the containers extending to one side,
   means at said inspection station for directing a beam through the open mouth of a container as it passes through said inspection station and focusing said beam in a spot in the bottom wall of the container,
   a light trap adjacent the bottom wall of the container into which said light beam normally passes after passing through the bottom wall,
   means for moving said spot along a diameter of said bottom wall,
   means for rotating each said container about its axis as it is moved through said inspection station to cause said moving spot to scan said bottom wall,
   a first mask adjacent the mouth of the container having a diametrically extending aperture through which said beam passes limiting the area through which the light beam passes,
   a second mask having a diametrically extending aperture adjacent to the outer surface of the bottom wall of the container limiting the area which is being viewed by the hereinafter mentioned light sensitive means,
   a plurality of light sensitive means positioned adjacent the outer surface of the bottom wall of the container with the lines of vision thereof passing through said apertures intersecting the bottom wall of the container and out of the normal path of said beam, means for creating a signal in response to energization of said light sensitive means.

References Cited

UNITED STATES PATENTS

| | | | |
|---|---|---|---|
| 2,265,037 | 12/1941 | Gulliksen | 88—14 |
| 2,296,027 | 9/1942 | Gettelman | 88—14 |
| 2,967,947 | 1/1961 | Flook | 250—219 |
| 3,030,516 | 4/1962 | Seavey | 250—221 |
| 3,150,266 | 9/1964 | Mathias | 250—224 |
| 3,180,994 | 4/1965 | Rottmann | 250—222 |
| 3,235,739 | 2/1966 | Rottmann | 250—223 |

WALTER STOLWEIN, *Primary Examiner.*